3,240,609
HYDROXY NAPHTHYLMETHYLAMINO BIS PRO-
PIONIC ACID DERIVATIVES AS ANTIOXIDANTS
FOR EDIBLE FATS AND OILS
Mitchell F. Zienty, Elkhart, Ind., assignor to Miles Laboratories, Inc., Elkhart, Ind., a corporation of Indiana
No Drawing. Original application Dec. 13, 1961, Ser.
No. 159,151. Divided and this application June 17,
1963, Ser. No. 296,149
14 Claims. (Cl. 99—163)

This application is a divisional application of my copending case Ser. No. 159,151, filed December 13, 1961.

This invention relates to new compositions of matter and to a process for preparing the compositions. In particular, the invention concerns hydroxy naphthylmethylamino bis propionic acid derivatives as new compositions having utility as antioxidants in protecting edible fats and oils against oxidative deterioration.

It is well known that certain edible fats and oils, especially commercially prepared products, such as lard and corn oil, are deficient in natural antioxidants. Because of this deficiency such products are highly vulnerable to deterioration in the presence of oxygen or air and will become rancid during storage, as characterized by unpleasant odors and flavors and off-colors.

The present invention resides in the discoverey that cetrain derivatives of hydroxy naphthylmethylamino bis propionic acids display exceptional antioxidative properties when incorporated into edible fats and fatty oils and products containing these compositions. Specifically, the novel inhibitors of this invention comprise 1-hydroxy-2-naphthylmethylamino - N - bis(propionitrile). 2 - hydroxy - 1 - naphthylmethylamino - N - bis(propionitrile), and the corresponding acids derived therefrom: 1 - hydroxy - 2 - naphthylmethylamino - N - bis(propionic acid) and 2-hydroxy - 1 - naphthylmethylamino - N - bis(propionic acid).

The novel compositions of this invention may be represented by the following formulas:

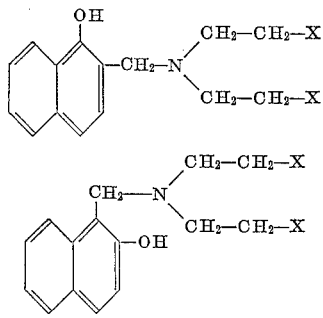

wherein X represents a functional group, such as —CN or —COOH.

The nitrile compositions are conveniently prepared as reaction products of β,β'-iminodipropionitrile, formaldehyde and α-naphthol or β-naphthol. The corresponding acid products are obtained by hydrolyzing the nitrile compounds with a hydroxide base, such as potassium hydroxide or sodium hydroxide.

The following equation, which illustrates the preparation of 1-hydroxy-2-naphthylmethylamino-N-bis(propionitrile) and the acid derivative thereof, is representative of the overall reaction:

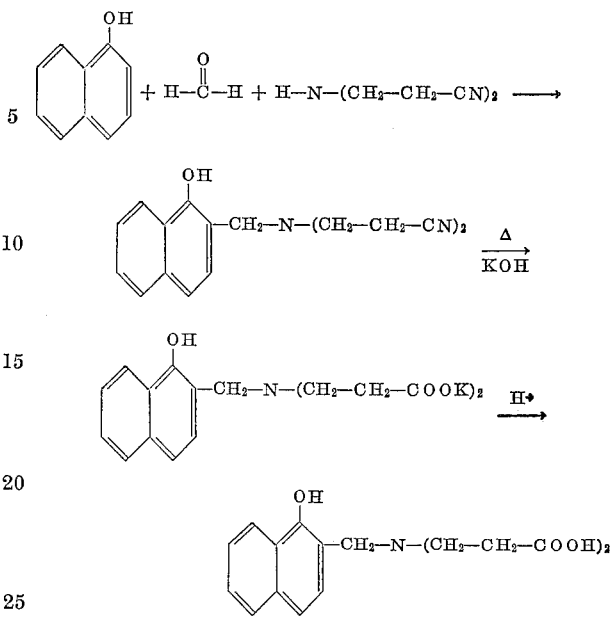

The 2-hydroxy - 1 - naphthylmethylamino - N - bis(propionitrile) compound of this invention, and the corresponding acid derivative, are obtained via the same procedure illustrated above, by using β-naphthol in place of α-naphthol.

Specific properties of the aforementioned compounds which make them particularly useful as antioxidants are non-toxicity, solubility in fats and oils and absence of undesirable odors, flavors and colors when incorporated into fatty substances to be protected.

In the practice of this invention the novel compounds are used to stabilize lard, castor oil and corn oil, but other materials which may likewise be protected include butter, beef tallow, linseed oil, rape seed oil, olive oil, palm oil, coconut oil, peanut oil, and the like.

To effectively inhibit oxidative deterioration in these materials the hydroxy naphthylmethylamino-N-bis propionic nitriles and acids of this invention are admixed therewith in small amounts, for example, from about 0.025% up to about 1.0% by weight, with the preferred concentration being about 0.025% to about 0.1% by weight.

When tested by means of the Swift Stability Test, commonly referred to as the Active Oxygen Method (AOM), subject antioxidants were found to retard rancidity in fats and oils for substantially longer periods of time than butylated hydroxy toluene, as well known lard antioxidant. The Swift Stability Test, which is described by A. F. King et al. in Oil and Soap Journal, vol. 10, pp. 105–109 (1933), consists in general of bubbling air through a sample of lard until rancidity develops, that is, until 20 milli-equivalents of hydrogen peroxide per kilogram of lard are produced.

Referring to the test data set out in the following table, the figures shown represent the time required (AOM time in hours) for rancidity to develop in lard, corn oil and castor oil when stabilized with the novel compositions of this invention, as compared to stabilization with butylated hydroxy toluene.

TABLE 1

| Inhibitor | AOM Time in Hours | | |
|---|---|---|---|
| | Lard | Castor Oil | Corn Oil |
| 1-hydroxy-2-naphthylmethylamino-N-bis (propionic acid) | 102 | 21 | 8 |
| 2-hydroxy-1-naphthylmethylamino-N-bis (propionic acid) | 72 | 30 | 16 |
| 1-hydroxy-2-naphthylmethylamino-N-bis (propionitrile) | 8 | 8 | 8 |
| 2-hydroxy-1-naphthylmethylamino-N-bis (propionitrile) | 8 | 8 | 8 |
| Butylated hydroxy toluene | 40 | 8 | 4 |

The following examples serve to illustrate, but not to limit, the procedures used in preparing the novel compositions of this invention:

*Example I.—Preparation of 1-hydroxy-2-naphthylmethylamino-N-bis(propionitrile)*

12.3 g. (0.1 mol) of β,β'-iminodipropionitrile was dissolved in 125 ml. of dioxane and 7.5 ml. of formalin was slowly added dropwise. The resulting mixture was stirred for 1 hour at room temperature. To this mixture was added 14.4 g. (0.1 mol) of α-naphthol all at once, and the reaction mixture was heated under reflux for 4 hours. The solvent, dioxane, was stripped off under reduced pressure, to give the crude nitrile product in the form of an oily residue, which was shown to possess antioxidant properties.

*Example II.—Preparation of 2-hydroxy-1-naphthylmethylamino-N-bis(propionitrile)*

12.3 g. (0.1 mol) of β,β'-iminodipropionitrile was dissolved in 125 ml. of dioxane and 7.5 ml. of formalin was slowly added dropwise. The resulting mixture was stirred for 1 hour at room temperature. To this mixture was added 14.4 g. (0.1 mol) of β-naphthol all at once and the reaction mixture was heated under reflux for 3 hours. The solvent, dioxane, was stripped off under reduced pressure, leaving an oily residue. To induce crystallization the oily mixture was treated with ether. The crystalline product was collected by filtration, dissolved in hot ether and allowed to cool to room temperature. Upon cooling the individual crystals separated from the solution to give the final product as a white, amorphous powder. Yield 27 g. M.P. 100°–101° C.

*Analysis.*—Calc'd for $C_{17}H_{17}N_3O$: N, 15.05. Found: N, 14.84.

*Example III.—Preparation of 1-hydroxy-2-naphthylmethylamino-N-bis(propionic acid)*

61.5 g. (0.5 mol) of β,β'-iminodipropionitrile was dissolved, with stirring, in 500 ml. of dioxane. 37.5 ml. of formalin was slowly added dropwise and stirring was continued for 2 hours at room temperature. 72.08 g. (0.5 mol) of α-naphthol was then added all at once and the reaction mixture was heated under reflux for 6 hours. The solvent, dioxane, was stripped off under reduced pressure, leaving an oily residue, which was allowed to cool to room temperature. After cooling, 300 ml. of aqueous potassium hydroxide (65.0 g. potassium hydroxide in water) was added to the oily mixture and it was refluxed for 1 hour, during which time a considerable amount of ammonia gas evolved. This solution was cooled to room temperature, acidified with glacial acetic acid and the resulting crude acid which precipitated was collected by filtration. The solid precipitate was dissolved in methanol, heated to 60° C., treated with activated charcoal, precipitated with water, filtered and dried. The final product was a fine, white powder, which melted at 298–300° C. Yield 27.0 g.

*Analysis.*—Calc'd for $C_{17}H_{19}NO_5$: N, 4.40. Found: N, 4.51.

*Example IV.—Preparation of 2-hydroxy-1-naphthylmethylamino-N-bis(propionic acid)*

31.7 g. (0.1 mol) of 2-hydroxy-1-naphthylmethylamino-N-bis(propionitrile) was placed in a 3-necked flask equipped with a stirrer and reflux condenser. To this compound was added 150 ml. of aqueous potassium hydroxide (37.5 g. potassium hydroxide in water) and the reaction mixture was heated under reflux for 3 hours. During the reflux period the potassium salt of the compound began to precipitate from solution. After reflux, the solution was cooled to room temperature, acidified with glacial acetic acid and the crude acid which precipitated was collected by filtration. The precipitate was dried, dissolved in hot benzene, treated with activated charcoal and filtered. The filtrate was treated with petroleum ether until the first permanent opalescence was observed and then cooled to room temperature to precipitate the final product as a colorless powder, melting at 197°–198.5° C. Yield 28.5 g.

*Analysis.*—Calc'd for $C_{17}H_{19}NO_5$: N, 4.40. Found: N, 4.56.

Following are examples illustrating utilization of the novel antioxidants of this invention in stabilizing various edible fats and oils against oxidative deterioration:

*Example V*

5 mg. of 1-hydroxy-2-naphthylmethylamino-N-bis(propionic acid) (0.025% by weight) was added to 20 g. of melted lard.

A commercially available rendered lard product was used, which had an uninhibited induction period of approximately 6 to 8 hours. As shown by the test data in Table 1, above, stabilization can be increased to approximately 102 hours using the inhibiting compound of this example.

*Example VI*

5 mg. of 2-hydroxy-1-naphthylmethylamino-N-bis(propionic acid) (0.025% by weight) was added to 20 g. of castor oil.

The castor oil used was a commercial product having an uninhibited induction period of approximately 20 hours. The data in Table 1, above, indicates that the inhibitor of this example stabilizes castor oil for approximately 30 hours.

*Example VII*

5 mg. of 2-hydroxy-1-naphthylmethylamino-N-bis(propionic acid) (0.025% by weight) was added to 20 g. of corn oil.

The corn oil of this example was a commercial product having an uninhibited induction period of approximately 3 hours. The test data of Table 1, above, clearly shows that stabilization of corn oil is increased to about 16 hours using the antioxidant composition of this example.

In summary, the present invention pertains to the preparation and application of novel hydroxy naphthylmethylamino-N-bis propionic acid derivatives as highly useful oxidation inhibitors for edible fats and fatty oils. Subject compounds are admixed with edible fatty materials in small amounts, ranging from about 0.025% to about 1.0% by weight. The preferred antioxidant is 1-hydroxy - 2 - naphthylmethylamino - N - bis(propionic acid), comprising about 0.025% by weight of the fatty composition to be stabilized.

What is claimed is:

1. A composition selected from the group consisting of edible fats and oils subject to oxidative deterioration containing as an inhibitor from about 0.025% to about 0.1% by weight of a compound selected from the group consisting of 1 - hydroxy - 2 - naphthylmethylamino-N-bis propionitrile, 2 - hydroxy - 1 - naphthylmethylamino-N-bis propionitrile, 1 - hydroxy - 2 - naphthylmethylamino-N-bis propionic acid and 2 - hydroxy - 1 - naphthylmethyl-amino-N-bis propionic acid.

2. A composition selected from the group consisting of edible fats and oils subject to oxidative deterioration containing as an inhibitor from about 0.25% to about 0.1% by weight of 1-hydroxy-2-naphthylmethylamino-N-bis propionitrile.

3. A composition selected from the group consisting of edible fats and oils subject to oxidative deterioration containing as an inhibitor from about 0.25% to about 0.1% by weight of 2-hydroxy-1-napthylmethylamino-N-bis propionitrile.

4. A composition selected from the group consisting of edible fats and oils subject to oxidative deterioration containing as an inhibitor from about 0.25% to about 0.1% by weight of 1 - hydroxy - 2 - naphthylmethylamino-N-bis propionic acid.

5. A composition selected from the group consisting of edible fats and oils subject to oxidative deterioration containing as an inhibitor from about 0.25% to about 0.1% by weight of 2-hydroxy-1-naphthylmethylamino-N-bis propionic acid.

6. Lard subject to oxidative deterioration containing as an inhibitor from about 0.025% to about 0.1% by weight of an acid selected from the group consisting of 1-hydroxy - 2 - naphthylmethylamino - N - bis propionic acid and 2-hydroxy-1-naphthylmethylamino-N-bis propionic acid.

7. Lard subject to oxidative deterioration containing as an inhibitor about 0.25% by weight of 1 - hydroxy-2-naphthylmethylamino-N-bis(propionic acid).

8. Lard subject to oxidative deterioration containing as an inhibitor about 0.025% by weight of 2-hydroxy-1-naphthylmethylamino-N-bis(propionic acid).

9. Castor oil subject to oxidative deterioration containing as an inhibitor from about 0.025% to about 0.1% by weight of an acid selected from the group consisting of 1 - hydroxy - 2 - naphthylmethylamino-N-bis propionic acid and 2 - hydroxy - 1 - naphthylmethylamino-N-bis propionic acid.

10. Castor oil subject to oxidative deterioration containing as an inhibitor about 0.025% by weight of 1-hydroxy - 2 - naphthylmethylamino - N - bis(propionic acid).

11. Castor oil subject to oxidative deterioration containing as an inhibitor about 0.025% by weight of 2-hydroxy - 1 - naphthylmethylamino - N - bis(propionic acid).

12. Corn oil subject to oxidative deterioration containing as an inhibitor from about 0.025% to about 0.1% by weight of an acid selected from the group consisting of 1 - hydroxy - 2 - naphthylmethylamino - N - bis propionic acid and 2 - hydroxy - 1 - naphthylmethylamino-N-bis propionic acid.

13. Corn oil subject to oxidative deterioration containing as an inhibitor about 0.025% by weight of 1-hydroxy-2-naphthylmethylamino-N-bis(propionic acid).

14. Corn oil subject to oxidative deterioration containing as an inhibitor about 0.025% by weight of 2-hydroxy-1-naphthylmethylamino-N-bis(propionic acid).

References Cited by the Examiner
UNITED STATES PATENTS

| | | | |
|---|---|---|---|
| 2,633,425 | 3/1953 | Thompson | 99—163 |
| 2,698,247 | 12/1954 | Thompson | 99—163 |

A. LOUIS MONACELL, *Primary Examiner.*